Dec. 19, 1967    E. C. LOWE    3,359,048
DYNAMIC SHAFT SEALING DEVICE AND BUSHING THEREFOR
Filed Oct. 20, 1965
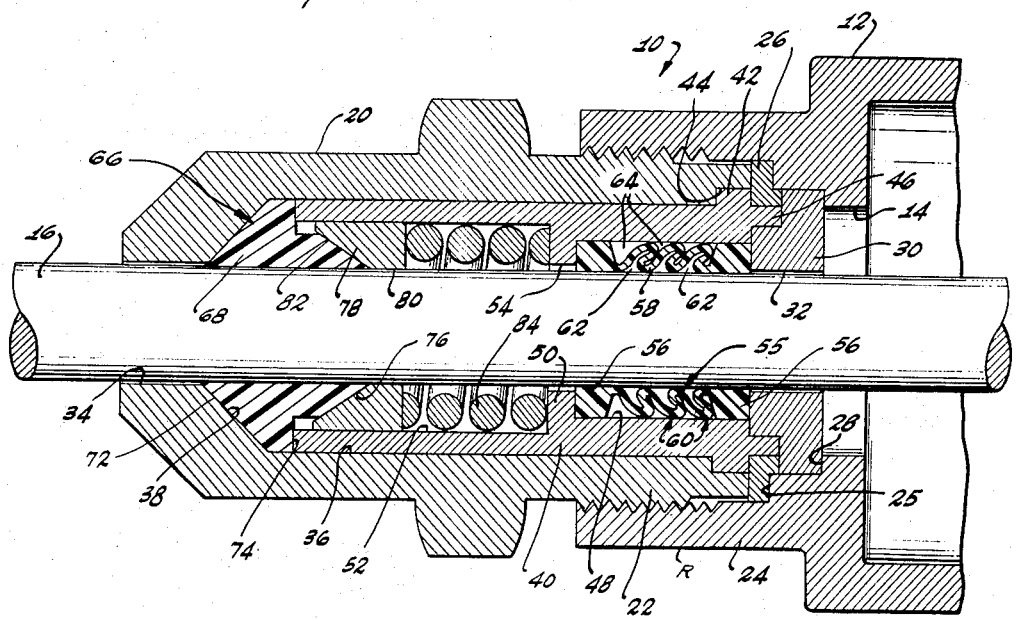
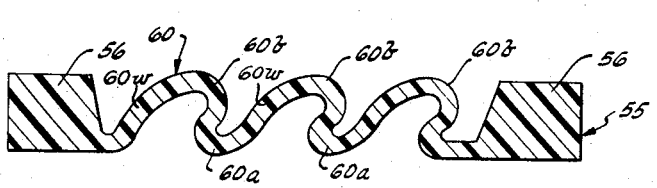
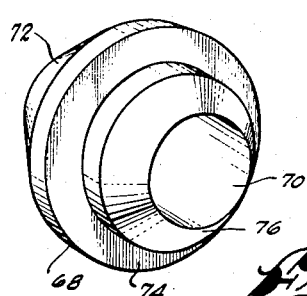
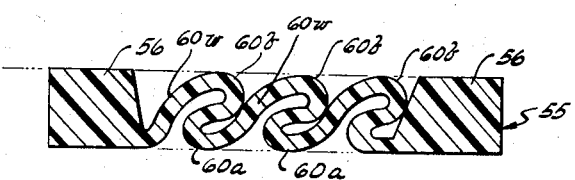
INVENTOR.
EDWIN C. LOWE
BY Forrest J. Lilly
ATTORNEY United States Patent Office 3,359,048
Patented Dec. 19, 1967

3,359,048
DYNAMIC SHAFT SEALING DEVICE AND BUSHING THEREFOR
Edwin C. Lowe, Van Nuys, Calif., assignor to Robbins Aviation, Inc., Vernon, Calif., a corporation of California
Filed Oct. 20, 1965, Ser. No. 502,774
Claims priority, application Japan, Nov. 2, 1964, 39/61,859
8 Claims. (Cl. 308—36.1)

This application is a continuation-in-part of my copending application, Ser. No. 397,793, filed Sept. 21, 1964, for Dynamic Shaft Sealing Device and Bushing Therefor.

This invention relates generally to improvements in fluid seals for shafts and, more particularly, to a dynamic shaft sealing device which is capable of highly efficient sealing action throughout a wide range of temperatures.

The current trends in industrial expansion, technological progress, and defense activities have created an ever increasing demand for machines and other products of various kinds which are capable of efficiently performing their intended uses or functions under widely varying environmental conditions. Many devices, for example, must be capable of efficient use or operation in any part of the world and, therefore, under the widely different temperature conditions encountered throughout the world, which may range between $-65°$ F. and $+165°$ F. Ambient temperature, of course, is not a critical design consideration to all devices. One class of device, however, to which ambient condition is an extremely important design consideration is a dynamic shaft seal.

Thus, a conventional dynamic shaft sealing device comprises a housing through which the shaft extends, a bearing for movably supporting the shaft in the housing, and an annular, resilient sealing element interposed between the shaft and housing to provide a fluid impervious seal therebetween. Generally speaking, a simple shaft seal of this kind can be designed to perform an effective sealing function over a limited temperature range. Such a shaft sealing device, however, is not suited to operation over a wide temperature range on the order of that mentioned above. The reason for this is that the bearing of the sealing device must be designed to afford proper running clearance for the supported shaft at the high temperature end of the range. Accordingly, when the shaft sealing device is exposed to temperatures near the low end of the range, the actual clearance between the shaft and its bearing is substantially greater than the optimum running clearance, due to thermal contraction of the shaft. Such excessive clearance at the low temperature end permits excessive lateral movement of the shaft in the bearing and misalignment of the shaft relative to the resilient sealing element, thereby resulting in loss of the fluid-tight integrity of the sealing device.

This loss in the fluid-tight integrity of the sealing device occurs for the following reasons: Lateral movement of the shaft relative to the resilient sealing element increases the lateral pressure of the shaft against one-half of the sealing element, i.e., that half toward which the shaft is laterally displaced, and relieves the lateral pressure of the shaft against the remaining half of the element. The relieved half of the element tends to expand and follow the laterally displaced shaft so as to remain in sealing contact with the shaft and housing. If this lateral displacement of the shaft were to occur, even rapidly, at higher temperatures at which the sealing element possessed its normal elastic properties, the element might very well expand at a sufficiently rapid rate to remain in contact with the shaft and housing and thereby preserve the fluid-tight integrity of the sealing device. As the ambient temperature is reduced to the low temperature end of the temperature range contemplated in this invention, however, the sealing element loses its elastic properties so the rate at which the element can expand to follow a lateral displacement of the shaft, and thereby maintain the fluid-tight integrity of the shaft seal, is reduced. As a consequence, it has been determined that when a conventional shaft sealing device of the type under discussion is designed for operation over a temperature range on the order of that mentioned earlier and is operated near the low temperature end of the range, the resilient sealing element is incapable of following, with sufficiently rapid response to preserve the fluid-tight integrity of the seal, the lateral motions of the shaft which occur as a result of the excessive clearance between the shaft and its bearing. Leakage, therefore, occurs past the sealing element.

It is a general object of this invention to provide an improved dynamic shaft sealing device which avoids the foregoing and other deficiencies of the existing dynamic shaft sealing devices of the character described.

A more specific object of the invention is to provide an improved dynamic shaft sealing device which maintains a highly efficient fluid-tight seal throughout a relatively wide range of temperatures.

A further object of the invention is to provide a novel shaft bearing or bushing for use in a shaft sealing device of the character described.

Yet a further object of the invention is to provide a shaft sealing device of the character described which is relatively simple in construction, economical to manufacture, easy to install, and otherwise ideally suited to its intended functions.

Other objects, advantages, and features of the invention will become readily apparent as the description proceeds.

Briefly, the objects of the invention are attained by providing a dynamic shaft sealing device wherein the shaft is movably supported in the housing of the sealing device by a bearing, or bushing, of novel construction and composed of polytetrafluoroethylene or the equivalent. This bushing is uniquely designed and arranged to accurately maintain the shaft and a resilient sealing element in axial alignment throughout the range of temperatures over which the sealing device is intended to operate. As a consequence, the shaft is restrained against lateral displacements relative to the resilient sealing element throughout the temperature range, and particularly at the low end of the temperature range at which such lateral shaft displacements would normally tend to cause fluid leakage past the sealing element. The bushing is also, in some cases, particularly in extreme low temperature applications, used as an additional seal, as will be discussed hereinafter.

According to the preferred practice of the invention, for example, the shaft bushing is composed of a low friction, resilient bearing material, which may be similar to or identical with the material from which the resilient sealing element of the sealing device is constructed. Polytetrafluoroethylene, known by its trademark Teflon, is the preferred material for both the bushing and the sealing element. The shaft bushing is preferably axially loaded, as by a spring, in such a way that the bushing follows the radial expansion and contraction of the shaft which occurs over the operating temperature range and thereby provides proper lateral support for the shaft throughout the entire temperature range. Then, preferably, in addition, the peripheral portion of the bushing is placed under axial compression, so as to form a seal between the front part of the housing and this seal, so as to safeguard against leakage under conditions of extreme low temperature.

A better understanding of the invention may be had from the following detailed description of a presently preferred embodiment thereof, taken in connection with the annexed drawing, wherein:

FIG. 1 is an axial section through a shaft sealing device according to the invention;

FIG. 2 is an enlarged perspective view of a shaft bushing embodied in the sealing device of FIG. 1;

FIG. 3 is an enlarged axial fragmentary section through a flexible sealing element embodied in the sealing device of FIG. 1; and FIG. 4 illustrates the sealing element of FIG. 3 in the axially compressed condition it occupies when installed in the sealing device of FIG. 1.

In this drawing, there is illustrated a dynamic shaft sealing device 10 for a hermetic enclosure 12 having an opening 14 in the wall thereof through which extends a movable shaft 16. The dynamic shaft sealing device 10 provides a fluid-tight seal between the enclosure 12 and the shaft 16. As will become apparent from the later description, the present sealing device will accommodate both axial and rotary motion of the shaft 16 as well as simultaneous axial and rotary motion of the shaft. In one application of the sealing device, for example, enclosure 12 is a valve body and shaft 16 is a valve stem.

Sealing device 10 comprises an outer sleeve-like body, housing means or bonnet 20 which surrounds the shaft 16, externally of the enclosure 12. In the particular design here shown, the seal housing 20 has an end 22 threadedly engaged in an annular coupling barrel 24 of a retainer means R, the barrel 24 being on the enclosure 12, about the opening 14. Positioned between the seal housing 20 and a shoulder 25 on the enclosure 12, about the opening 14, is a static seal ring 26 whose function is to provide a fluid-tight joint between the housing and enclosure. Confined between the seal ring 26 and an internal annular shoulder 28 on the enclosure 12 is a disc-like retainer ring 30 having a central bore 32 through which the shaft 16 passes. The diameter of the bore 32 is sufficiently larger than the diameter of the shaft 16 to provide a slight clearance between the shaft and retainer ring throughout the temperature range over which the sealing device 10 is intended to operate.

In the outer end of the seal housing 20 is a bore 34 through which the shaft 16 extends to the exterior of the latter housing. The diameter of the bore 34 is sufficiently larger than the diameter of the shaft 16 to provide a slight clearance between the shaft and the wall of the bore throughout the entire temperature range over which the sealing device 10 is to operate.

Within the seal housing 20 is a cylindrical cavity or bore 36 which opens through the inner, or right-hand, end of the housing, as the latter is viewed in FIG. 1. The outer, or left-hand, end of the cavity 36 terminates at a conically tapered end wall surface 38 on the seal housing 20, about the shaft bore 34.

Slidably received within the cavity 36 in the seal housing 20 is a retainer sleeve 40. At the right-hand end of this sleeve is an external annular shoulder 42 which engages in an internal annular groove 44 in the right-hand end of the seal housing 20 to axially position the sleeve 40 relative to the housing. Sleeve 40 is shown to have an axially extending, annular flange 46 over which the static seal ring 26 fits and which, in turn, fits over a reduced diameter shoulder portion on the retainer ring 30. The elements 30 and 40 will be seen to comprise internal components of the housing means 20.

Extending axially into the inner, or right-hand, end of the retainer sleeve 40 is a bore 48, of larger diameter than shaft bore 32, terminating, at its outer end, in an internal annular shoulder 50 within the sleeve. Extending axially into the outer, or left-hand, end of the sleeve 40 is a bore 52. Bore 52 terminates at the sleeve shoulder 50 and communicates with bore 48 through a bore 54 in the shoulder. The diameter of the bore 54 is sufficiently larger than the diameter of the shaft 16 that a slight clearance exists between the shaft and the wall of the bore throughout the entire temperature range over which the sealing device 10 is intended to operate.

Positioned within the sleeve bore 48 is a resilient sealing element 55 which provides a fluid-tight seal between the shaft 16 and the sleeve 40. This sealing element per se forms, in part, the subject matter of my copending application Ser. No. 397,837 filed Sept. 21, 1964, and entitled Dynamic Shaft Seal. Accordingly, the sealing element will be described herein only in sufficient detail to enable a clear understanding of the present invention. For a more detailed description of the element, reference should be had to the copending application, the subject matter of which is incorporated herein by this reference. With this in mind, the sealing element 55 comprises a sleeve constructed of tetrafluoroethylene, known by its trademark Teflon, or other low friction, resilient equivalent material suitable for use as a sealing element. At the ends of the sealing element 55 are solid annular shoulders or collars 56 connected by an intervening wall 58 of reduced thickness. This wall is shaped to form a multiplicity of circumferential convolutions or corrugations 60 which define inwardly opening cavities 62 and outwardly opening cavities 64. As the drawings shown, the corrugations 60 are preferably inclined to the longitudinal axis of the seal sleeve 55.

FIG. 3 shows the sealing element 55 in the condition in which it exists prior to insertion into the sleeve bore 48. It will be observed that in this initial condition of the sealing element, the inner surfaces of the inwardly directed corrugations 60a are substantially flush with the inner cylindrical surfaces of the end shoulders 56 of the element. The outer surfaces of the outwardly directed corrugations 60b are substantially flush with the outer cylindrical surfaces of the end shoulders 56. The axial length of the sealing element 55, prior to its insertion into the sleeve bore 48, is somewhat greater than the axial spacing between the confronting surfaces of the retainer 30 and the sleeve shoulder 50, which surfaces axially confine the sealing element when inserted into the bore 48. The radial thickness of the end shoulders 56 on the sealing element 55 is slightly greater than the radial clearance between the shaft 16 and the wall of the sleeve bore 48.

When the sealing element 55 is installed in the sleeve bore 48, the outer cylindrical surfaces of the end shoulders 56 engage the wall of the bore and the inner surfaces of these shoulders bear against the shaft 16. The sealing element is axially compressed between the retainer 30 and the internal sleeve shoulder 50. This axial compression of the sealing element causes the corrugations 60a and 60b of the element to assume the condition shown in FIGS. 1 and 4 wherein the inner surfaces of the corrugations 60a bear on the shaft 16 and the outer surfaces of the corrugations 60b engage the wall of the bore 48. As explained in my aforementioned copending application Ser. No. 397,837, fluid pressure in the enclosure 12 urges the corrugations 60a more tightly against the shaft 16 and the corrugations 60b more tightly against the wall of the retainer bore 48, thereby to substantially entirely prevent fluid leakage past the sealing element throughout a wide temperature range. The action of fluid pressure on the inner end of the element creates a left hand or outwardly directed force on the outer circumference of the rearwardly inclined forward corrugation wall 60w of each outwardly directed corrugation, and a right hand or inwardly directed force on the inner circumference of each such corrugation wall 60w. In other words, axial compression of the sealing element creates on each radial section of each corrugation wall 60w a force couple which tends to rotate the respective wall section toward a plane normal to the shaft 16. As a consequence, each corrugation wall 60w tends to assume a position more normal to the shaft and is thereby wedged more tightly between the shaft and the outer wall bore 48. This wedging action, in turn, places each corrugation wall under increased radial compression, thereby improving substantially the effective sealing contact with both the shaft 16 and the bore 48.

As explained earlier, in order to preserve the fluid-tight integrity of the sealing device 10 over the wide range of temperatures contemplated in this invention, to wit, −65° F. to +165° F., it is essential that the shaft 16 be positively restrained against lateral displacement relative to the sealing element, and thereby accurately maintained in axial alignment with the element, over the entire temperature range. This restraint of the shaft against lateral displacement and retention of the shaft in axial alignment with the sealing element 55 is accomplished by a unique bushing assembly 66 according to the invention. Bushing assembly 66 comprises a bushing 68 proper composed of a resilient, low friction bearing material which preferably comprises the same material as the sealing element 55, to wit, polytetrafluoroethylene, sold under the trademark Teflon. Extending through the bushing 68 is a bore 70 through which the shaft 16 passes. The outer end face 72 of the bushing 68 is conically tapered at the same angle as the confronting inner conical surface 38 of the seal housing 20. The inwardly directed end of the bushing 68 is reduced in diameter to form an inwardly presented annular shoulder 74 about the bushing. This shoulder is engaged by the outer end face of the sleeve 40, whereby the bushing 68 is confined between the conical end surface 38 of the seal housing and the outer end face of the sleeve 40. According to a preferred feature of the invention, the retainer sleeve 40 is made longer, from its shoulder 42 to its forward extremity, than the initial distance from the shoulder 42 to the bushing shoulder 74, so that the extremity of the retainer sleeve, when the bonnet has been fully screwed into the retainer barrel 24, will be slightly indented into the bushing shoulder, and the peripheral region of the bushing will then be under high axial compression. The reason for this provision will be pointed out hereinafter. The inwardly directed end of the bushing 68 is conically tapered at 76.

Slidably positioned within the outer bore 52 in the sleeve 40 is a pressure ring 78 having a central bore 80 through which the shaft 16 passes. The diameter of this bore is sufficiently larger than the diameter of the shaft 16 that a slight clearance exists between the shaft and the wall of the bore throughout the entire temperature range over which the sealing device 10 is intended to operate. The side of the pressure ring 78 confronting the bushing 68 is conically bored to provide the ring with a conically tapered surface 82 having the same angle of taper as the conically tapered surface 76 on the bushing. Encircling the shaft 16, within the bore 52 in the sleeve 40, is a compression spring 84 which seats at one end against the sleeve shoulder 50 and at the opposite end against the confronting face of pressure ring 78. Spring 84, therefore, urges the pressure ring 78 against the bushing 68 and, thereby, the bushing against the conically tapered end wall surface 38 of the seal housing 20. The bushing is thus centered in the seal housing 20.

It is further apparent that the bushing 68 is axially compressed between the conically tapered end wall surface 38 on the seal housing 20 and the conically tapered surface 82 on the seal ring 78. The compression forces exerted by the surfaces 38 and 82 on the bushing have components which are directed radially in toward the shaft 16 and serve to radially compress the bushing toward the shaft 16, about the entire circumference of the bushing. The bushing assembly 66, including the bushing 68 proper, the pressure ring 78, and the spring 84, is so designed that the radial compression forces produced on the bushing by the spring 84 retain the bushing in effective supporting contact with the shaft 16 throughout the temperature range over which the dynamic sealing device 10 is intended to operate. Thus, when the sealing device 10 is exposed to increasing temperature, the shaft 16 expands radially, thereby exerting an outward radial force on the bushing 68, about the entire circumference of the shaft. This outward radial force on the bushing causes the latter to expand radially against the conically tapered surface 38 on the seal housing 20 and the conically tapered surface 82 on the pressure ring 78, thereby creating an axial force on the pressure ring 78 in a direction opposing the force of the spring 84 on the pressure ring. The pressure ring thus moves to the right in FIG. 1, against the action of the spring. When the sealing device 10 is exposed to a diminishing temperature, the shaft 16 contracts radially, thereby relieving the radial force exerted on the bushing 68 by the shaft. Under these conditions, the axial force exerted by the spring 84 on the bushing 68 is effective to radially contract the bushing about the shaft 16, as the latter contracts in response to reducing temperature. The mating conical surfaces 38, 72 and 76, 82 on the seal housing, pressure ring and bushing constantly center the bushing in the seal housing. The bushing 68 is thus permitted to expand radially, as the shaft 16 expands radially, under increasing temperature conditions, and the bushing is caused to contract radially, when the shaft 16 contracts radially, under reducing temperature conditions, in such manner that the bushing remains centered in the seal housing 20 and in effective supporting contact with the shaft throughout the temperature range for which the sealing device 10 is designed.

It is now apparent, therefore, that the bushing assembly 66 is temperature compensated in such a way as to positively support the shaft 16 against lateral displacement, and maintain the shaft in coaxial alignment with the sealing element 55, throughout the temperature range for which the sealing device 10 is designed. As discussed earlier, and in greater detail in my aforementioned copending application, the sealing element 55 is effective to prevent fluid leakage between the shaft and the sealing element as well as between the sealing element and the wall of its containing bore 48. The aligning feature of the bushing aids this sealing device in effecting its seal.

For extremely low temperatures, and when using a material of high coefficient of expansion, such as Teflon, for example, for the seal 55, there can be some possibility of leakage around the outside of the seal. That is to say, while at low temperatures, the seal 55 will contract tightly about the shaft, and provide a perfect seal along the shaft, it may in some cases contract sufficiently as to permit leakage between the outside corrugations 60b and the retainer sleeve 40. Accordingly, as a further important but optional feature particularly for very low temperature conditions, I have found it advantageous to make the retainer sleeve 40 long enough to not only meet the bushing shoulder 74, but to place the peripheral portion of the bushing opposite said shoulder under substantial axial compression between said shoulder 74 and the housing surface 38, even to the point, preferably, that the end of the sleeve 40 becomes slightly indented into the bushing when the housing 20 is screwed fully home into the retainer member 24. Thereby an effective pressure-tight seal is obtained at the point of engagement between the sleeve 40 and the bushing. The peripheral region of the bushing, opposite the end of the sleeve 40, is thus axially compressed between the end of sleeve 40 and the conical housing surface 38, and this accomplishes a good pressure seal for low temperature conditions both between the end of sleeve 40 and the bushing shoulder 74, and also between the conical face 72 of the bushing and the conical surface 38 of the housing. The extra length of the sleeve 40 to accomplish this function may be from a few thousandths of an inch up to, say, 25/1000 of an inch. With an incremental length increase of the order of 25/1000, of course, a fair amount of cold flow takes place within and around the bushing as the end of the sleeve indents and seats itself into and slightly below the shoulder.

Dynamic sealing devices according to the invention have been constructed and tested over the range of temperatures mentioned earlier. In one test of a sealing device according to the invention, for example, the shaft 16 was on the order of .249 to .250 inch in diameter. The sealing element 55 and the bushing 68 were constructed of Teflon. The diameter of the bore 70 in the bushing, when the latter was in its normal unstressed condition, was on the order of .247 to .249 inch. The spring 84 had a spring rate on the order of 450#/inch. The sealing element was on the order of .358 inch in outside diameter and .246 inch in inside diameter at the end shoulders 56, .535 inch in unstressed length, and had a corrugated wall thickness of .020 inch. The seal cavity 48a had an outer diameter of .355 inch and a length of .400 inch. The sealing device was tested under pressures on the order of 2000 p.s.i. and no fluid leakage was observed.

The invention herein described and illustrated is thus fully capable of attaining the several objects and advantages preliminarily set forth. While a presently preferred embodiment of the invention has been disclosed for illustrative purposes, various modifications in the design, arrangement of parts, and instrumentalities of the invention are possible within the spirit and scope of the following claims.

I claim:
1. The combination of a dynamic shaft sealing device and shaft-centering bearing bushing comprising
   a housing means having an axial cylindrical shaft-receiving bore therethrough for receiving said shaft with clearance, said bore having an enlarged cylindrical seal-seleeve-receiving portion coaxial with its axis;
   a resilient plastic, circumferentially corrugated seal sleeve, confined under axial compression in said enlarged portion of said bore and having outwardly and inwardly directed corrugations bearing against the defining surfaces of said portion of said bore and said shaft, respectively;
   a resilient plastic bushing, for said shaft, said bushing being confined in said housing in a cavity therein around said shaft bore in axial alignment with said enlarged cylindrical portion of said bore for said shaft, said bushing having a smooth cylindrical axial bearing bore therethrough for said shaft, one end of said bushing being in abutting engagement with a coaxial inner annular surface of the housing means;
   a pressure ring additionally mounted in said housing means having a bore for receiving the shaft and having a coaxial annular surface for engaging the opposite end of the bushing;
   a spring acting between the housing means and the pressure ring for urging it axially against the bushing to produce a yieldable compression force against the bushing, at least one end of said bushing being conically tapered towards its extremity and said annular surface engaged by said end of the bushing being correspondingly conical in form, such that the compressive force exerted against said bushing by said spring develops a component of radially inwardly directed compressive force all around the bushing, whereby the bushing is adapted to radially expand and contract in operation in response to radial thermal expansion and contraction of the shaft throughout a substantial range of operating temperatures, so as to support said shaft in alignment with the axis of said enlarged bore and of said sealing sleeve therein throughout said range of operating temperatures.

2. The subject matter of claim 1, wherein said outwardly and inwardly directed corrugations of said sealing sleeve are formed in inclined positions relative to the longitudinal axis of said sleeve.

3. The combination of claim 1, wherein the conically tapered annular surface is on the housing means.

4. The combination of claim 1, wherein the conically tapered annular surface is on the pressure ring, and the pressure ring is coaxially centered relative to the axis of the housing means.

5. The combination of claim 1, wherein both ends of said bushing and both of said annular surfaces are conical in form, and wherein said pressure ring engages the corresponding annular conical surface, and is coaxially centered on the axis of said housing means.

6. The subject matter of claim 1, wherein said bushing has an outer peripheral portion disposed radially outside the periphery of said pressure ring and said peripheral portion has an axially facing annular shoulder thereon; and
   a shoulder in said housing means engaging said annular bushing shoulder fixedly positioned in said housing means in axially directed pressure engagement against said annular bushing shoulder.

7. The subject matter of claim 5, wherein said housing means comprises:
   a cylindrically bored bonnet and a cylindrical sleeve fixed therein, said cylindrical seal-sleeve-receiving portion of said bore being formed in said sleeve,
   said sleeve surrounding said spring and said pressure ring, and engaging axially at the corresponding end thereof, against a peripheral region of said bushing, outside the annular conical surface on said bushing engaged by said pressure ring, said sleeve being positioned so as to indent axially into said peripheral region of said bushing.

8. The combination of claim 1, wherein said sleeve and said bushing is composed of polytetrafluoroethylene.

References Cited

UNITED STATES PATENTS

| | | | |
|---|---|---|---|
| 1,324,775 | 12/1919 | Anathor | 308—3.5 |
| 1,427,256 | 8/1922 | Blanchard | 277—115 |
| 1,510,205 | 9/1924 | Beaty | 277—125 |
| 1,565,448 | 12/1925 | Hewitt | 308—36.6 |
| 1,840,312 | 1/1932 | Dunmire | 277—110 |
| 1,987,135 | 1/1935 | Sugdon | 277—100 X |
| 2,240,644 | 5/1941 | Focht | 277—115 |
| 2,443,332 | 6/1948 | Summers | 277—64 |
| 2,681,257 | 6/1954 | Niesemann | 308—36.2 |
| 2,745,687 | 5/1956 | Stock | 277—110 |
| 2,828,149 | 3/1958 | Deventer | 277—66 |
| 3,218,098 | 11/1965 | Rowlett | 308—70 |

FOREIGN PATENTS

| | | |
|---|---|---|
| 779,200 | 7/1957 | Great Britain. |
| 824,964 | 12/1959 | Great Britain. |
| 478,957 | 3/1953 | Italy. |

MARTIN P. SCHWADRON, *Primary Examiner.*

L. L. JOHNSON, *Assistant Examiner.*